REGULATING ARRANGEMENT EMPLOYING A SYMMETRICAL VARISTOR

Filed March 16, 1964

INVENTORS
Neale A. Zellmer
George S. Wu
BY
C. A. Gulbrandsen
ATTY.

REGULATING ARRANGEMENT EMPLOYING A SYMMETRICAL VARISTOR

Filed March 16, 1964 2 Sheets-Sheet 2

INVENTORS
Neale A. Zellmer
George S. Wu
BY C. A. Gulbrandsen
ATTY.

United States Patent Office 3,312,907
Patented Apr. 4, 1967

3,312,907

REGULATING ARRANGEMENT EMPLOYING A SYMMETRICAL VARISTOR

Neale A. Zellmer, Belmont, and George S. Wu, Santa Clara, Calif., assignors, by mesne assignments, to Automatic Electric Laboratories, Inc., Northlake, Ill., a corporation of Delaware Filed Mar. 16, 1964, Ser. No. 351,998
2 Claims. (Cl. 330—29)

This invention relates to regulating arrangements and more particularly to carrier regulating arrangements employing symmetrical varistors in active variolosser circuits for controlling through signal transmission.

Carrier systems encounter a number of problems which the terminals and repeaters must be equipped to solve. One of these problems is the nominal line attenuation versus frequency characteristic. Suitable gain-frequency shaping techniques are employed to achieve equalization in such systems. However, an equally important problem, and one with which this invention is more concerned, is the change of line attenuation as a result of changes in the ambient conditions surrounding the transmission path. Ever-changing environmental conditions require some means for automatic regulation to maintain the loss of the system at a specific level.

Attenuation of a transmission line increases with temperature, the amount of increase becoming greater at the higher frequencies. Furthermore, wet weather and ice increase attenuation in the case of open wire lines.

It is an object of the invention to provide new and improved carrier regulating apparatus.

Many regulator arrangements go "wide open" on the loss of signal and, as a result, singing may occur. It is a further object of the invention to provide an improved regulator arrangement which holds to a fixed maximum gain, thereby preventing singing.

A feature of the invention lies in the use of an active variolosser arrangement in the transmission path. This active variolosser arrangement includes a symmetrical varistor which is biased by its associated transistor circuitry to control the gain of the regulating arrangement. The active variolosser is controlled by a bias that is derived via a feedback path from the output signal.

These and other objects and features of the invention will become apparent and the invention will best be understood from the following description taken in conjunction with the accompanying drawings.

GENERAL DESCRIPTION

Figure 1:
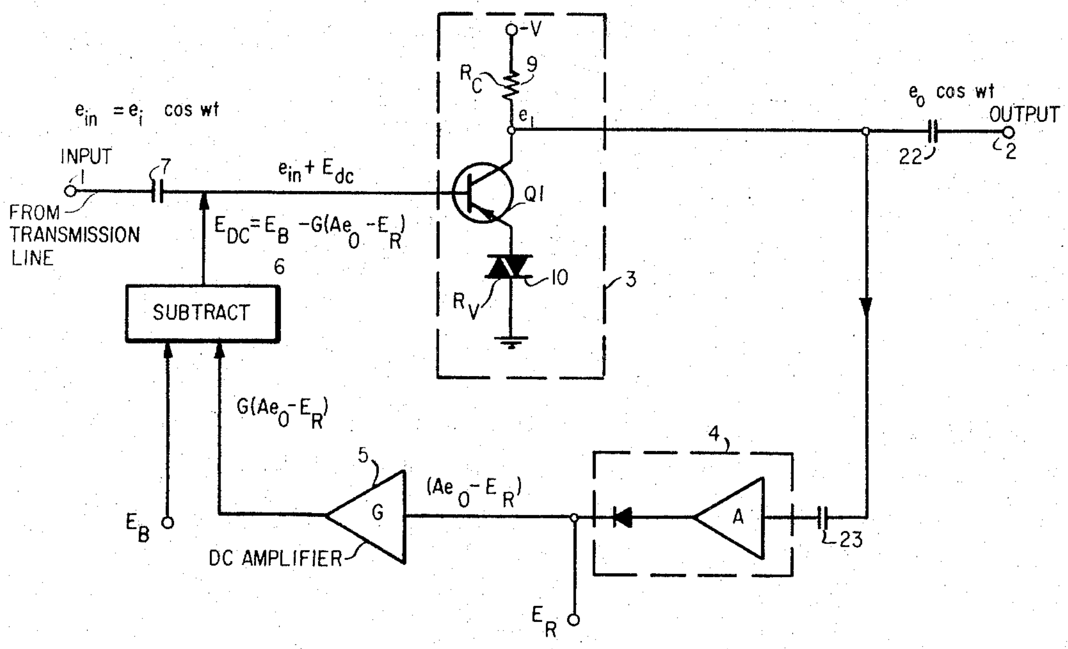
FIG. 1 is a block diagram representation of an embodiment of the invention.

FIG. 1, in addition to being a block diagram representation, is also a simplified mathematical analysis of the invention and will be employed herein to describe the underlying principles of the invention. Included in FIG. 1 are an input terminal 1 connected to an incoming transmission line, an output terminal 2 connected to an outgoing transmission line, and a symmetrical varistor active variolosser 3 having a transistor Q1. The variolosser serves as the regulating stage of the invention. A feedback loop controls the variolosser 3. This feedback loop comprises a sampling amplifier and rectifier circuit 4 having a conversion gain A, a source of reference voltage $E_R$, a direct current amplifier 5 having a gain G, a quiescent bias potential $E_B$, and a voltage subtractor circuit 6.

Figure 2:
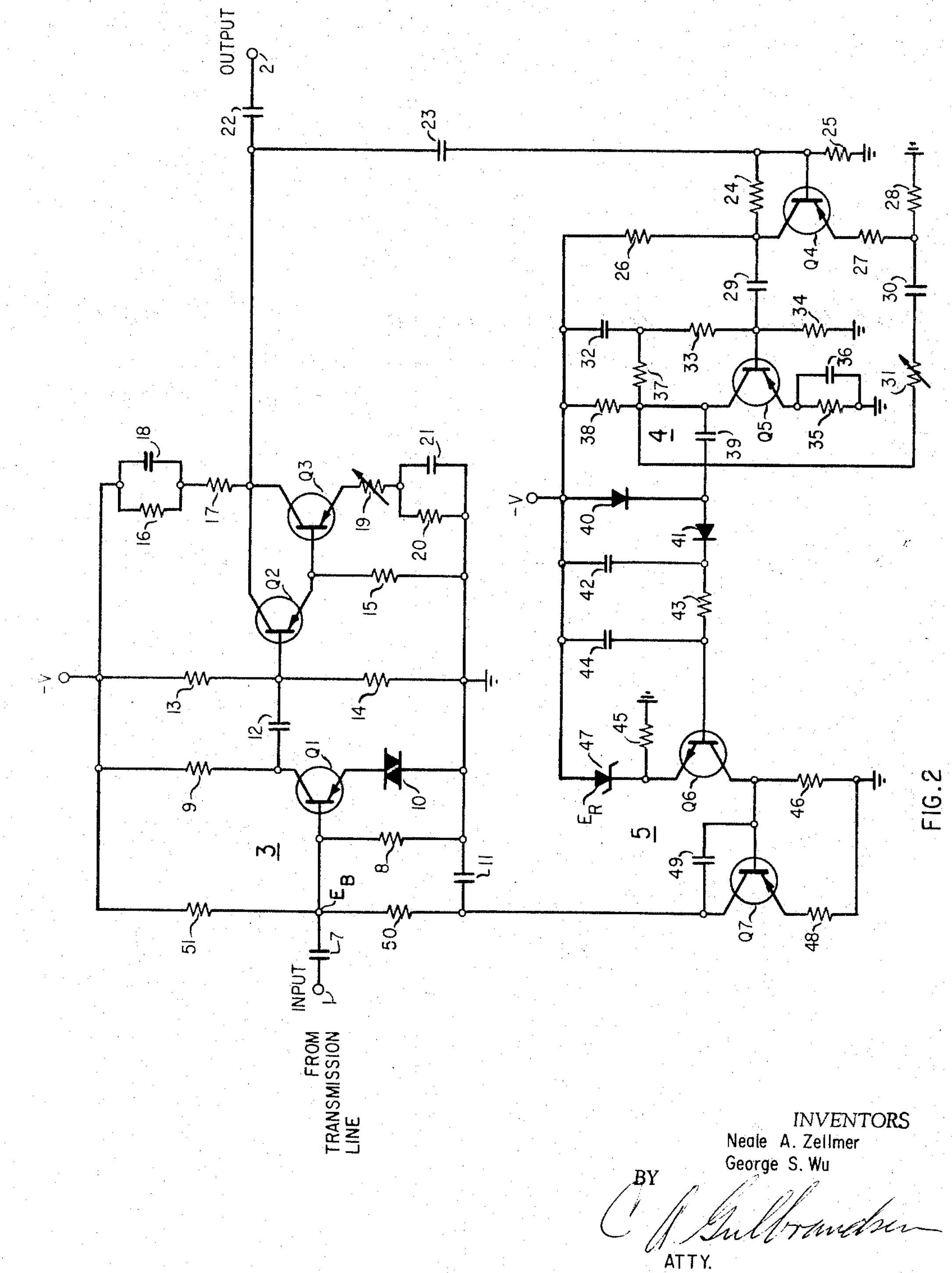
FIG. 2 is a detailed circuit diagram of the invention.

In somewhat more detail, FIG. 2 shows that the variolosser 3 includes a transistor Q1 having a symmetrical varistor 10 in its emitter circuit. Included in FIG. 2, but not shown in FIG. 1, is an amplifier circuit including transistors Q2 and Q3. This sampling amplifier and rectifier circuit 4 includes transistors Q4, Q5 and diodes 40, 41 as its major components. A Zener diode 47 interposed between the potential —V and transistor Q6 supplies the reference potential $E_R$. Transistors Q6 and Q7 form a direct current amplifier, while transistor Q7 additionally performs a voltage subtraction function along with resistance 51 and potential —V. The quiescent bias $E_B$ is supplied by the voltage divider between —V and ground, mainly resistances 51 and 8.

DETAILED DESCRIPTION

Referring to FIG. 1, it can be seen that an incoming signal passes through the active variolosser to the output terminal 2. This output voltage is also coupled by way of capacitance 23 to the input of the sampling amplifier and rectifier circuit 4. After rectification the output signal, now a D.C. signal, is compared with a reference voltage $E_R$ and connected to the input of the direct current amplifier 5. After amplification this D.C. control signal is subtracted from a quiescent bias voltage $E_B$ in the subtractor circuit 6. The resulting operating bias voltage $E_{DC}$ is then used as the operating bias for the active variolosser circuit 3.

Referring to FIG. 2 a more detailed description may be seen of the regulating arrangement. Again, signals from the transmission line enter at terminal 1 and are passed through the variolosser circuit 3, which is now followed by an amplifying circuit including transistors Q2 and Q3, and coupled to the output 2 by capacitance 22. This output signal is also coupled by capacitance 23 as it was in FIG. 1 to the base input of transistor Q4 which is a part of the sampling amplifier (Q4, Q5) and rectifier circuit 4. This amplified signal is rectified and filtered by elements 40 to 44 and at the first stage (Q6) of the direct current amplifier 5 it is compared with a reference voltage $E_R$ which is derived from a Zener diode 47 interposed in the emitter circuit of transistor Q6. This compared signal is now taken from transistor Q6 at its collector and presented to the base of transistor Q7 which is the second stage of the direct current amplifier 5. Transistor Q7 along with mainly resistances 51 and 50 also provides the subtractor action of the subtractor circuit (referenced 6 in FIG. 1) wherein the compared or error signal is subtracted from the quiescent bias $E_B$.

Potential $E_{DC}$ is the operating bias of transistor Q1 and therefore controls the base current of transistor Q1. The emitter-collector current of a transistor, as is well known, is dependent on its base current. Therefore varistor 10 is provided a D.C. bias that is derived from the output of the regulator arrangement.

Figure 3:
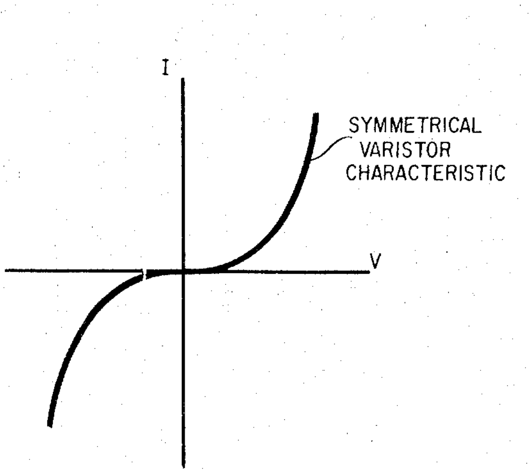
FIG. 3 is a graphical representation of the current-voltage characteristic of a symmetrical varistor to aid in understanding the invention.

In FIGS. 1 and 2 the through transmission is from terminal 1 to terminal 2. As the attenuation characteristics of the incoming line change, the input signal, and hence the output signal, will also change accordingly. The output signal is sensed by the feedback path and the bias of the regulating stage 3 is automatically adjusted to compensate for that change. In our U.S. patent application "Compandor System Employing Symmetrical Varistors," Serial No. 300,217, filed August 6, 1963, and assigned to the same assignee as the present invention, we discuss the non-linear characteristics of the symmetrical varistor as applied to compression and expansion techniques. Such a characteristic curve is shown in FIG. 3. We further explain that the dynamic resistance of such an element can be stated as $$R_V = 1/nKV_{DC}^{n-1} \quad (1)$$

where K and $n$ are physical constants of the non-linear material. If in our regulator arrangement we wish the output voltage to be $e_D \cos wt$, and the error in the output signal ($e_o - e_D$) is $x$, it can be shown that considering the dynamic proportion of the output signal $$\frac{X}{e_D} \simeq \frac{E_B}{-GE_R} \quad (2)$$

which contains the essential factors for controlling the performance of a symmetrical varistor regulating arrangement when operating at a high $n$ of the varistor. It should be noted that although the polarity across the symmetrical varistor is in one direction, the symmetrical varistor is employed because of its great dynamic impedance range which is not found in asymmetrical varistors (conventional diodes).

When a signal passes through the regulating arrangement, it is coupled to the output terminal 2 by capacitance 22. This signal is also coupled via capacitance 23 to the input of the sampling amplifier and rectifier circuit 4 where it is amplified, rectified and compared with a reference potential $E_R$, as previously discussed. The derived direct current is subtracted from the quiescent bias potential $E_B$ to obtain the operating D.C. bias for the variolosser circuit 3. It is easily seen that if there is no input, and hence no output signal, the active variolosser has a fixed direct current bias $E_B$ to prevent it from going "wide open."

Returning to Equation 2 for a moment, one would say that regulation can be controlled and the $x/e_D$ ratio minimized by decreasing potential $E_B$. On the contrary however, FIG. 1 shows that $E_B$ is an essential portion of the operating bias $E_{DC}$ which must necessarily be kept high to operate the varister in its high "$n$" region (FIG. 3). The factors G and $E_R$ however may be controlled to this end.

A particular circuit design has been operated within a 20 db range and provides a 1000:1 stiffness ratio. The following is a list of component values for a 1000:1 stiffness ratio regulating arrangement.

| Capacitances: | μf. |
|---|---|
| 36 | 0.02 |
| 32 | 0.05 |
| 7, 12, 18, 22, 23, 29, 30, 44 | 0.5 |
| 11, 21, 39, 42 | 1 |
| 49 | 4 |

| Resistances: | Ohms |
|---|---|
| 35 | 51 |
| 48 | 100 |
| 43 | 200 |
| 27 | 220 |
| 19 | 500 |
| 17, 50 | 600 |
| 28 | 750 |

| | k.-Ohms |
|---|---|
| 9, 38 | 1 |
| 16 | 1.2 |
| 20 | 2.4 |
| 26 | 6.8 |
| 34 | 8.2 |
| 45, 46 | 10 |
| 33 | 11 |
| 51 | 12 |
| 25 | 20 |
| 24 | 33 |
| 31 | 50 |
| 8, 37 | 51 |
| 15 | 75 |
| 13 | 150 |
| 14 | 160 |

| Diodes: | |
|---|---|
| 40, 41 | 1N34 |
| Zener volts | 13.6 |

| Varistor: | |
|---|---|
| 10 | GE 66D-70000 |

| Transistors: | |
|---|---|
| Q1, Q5 | 2N600 |
| Q2, Q3, Q4, Q7 | 2N404 |
| Q6 | 2N1155 |

The power supply of the circuit of FIG. 2 is −35 v. D.C.

A similar circuit requiring only five transistor stages can be realized having a stiffness ratio of 130:1. These specific values have been offered by way of illustration only. Many other changes and modifications may be made in the invention by one skilled in the art without departing from the spirit and scope of the invention and should be included in the appended claims.

What is claimed is:

1. A circuit for regulating the gain in a transmission path to compensate for variations in input signal level, comprising:

(a) a voltage supply, a source of first reference potential and a source of second reference potential, (b) variolosser means including a first transistor having a base electrode for receiving an input signal, a collector electrode and an emitter electrode, a load impedance connecting said collector electrode to said voltage supply, and variable impedance means connecting said emitter electrode to said source of first reference potential, the impedance of said variable impedance means being automatically controlled by the conduction of said first transistor, (c) an output circuit connected to said collector electrode for providing an output signal from said variolosser means, (d) sampling means connected to said output circuit for deriving a D.C. signal representative of said output signal, (e) error means connected to said sampling means and to said source of second reference potential for deriving an error signal, and (f) means connected to said voltage supply and to said base electrode for establishing a quiescent bias at said base electrode in the absence of an input signal, said last-mentioned means further connected to said error means and operative to subtract said error signal from said quiescent bias to control the conduction of said first transistor and vary the impedance ratio of said load impedance to said variable impedance means whereby said output signal is maintained at a substantially constant level.

2. The circuit according to claim 1 wherein said means for establishing a quiescent bias comprises a voltage divider network including a plurality of resistances and a second transistor having a base electrode connected to said error means for receiving said error signal, an emitter electrode and a collector electrode, said collector and emitter electrodes being serially connected in circuit with said plurality of resistances and said voltage supply, and circuit means connected to said second transistor for biasing said second transistor, said second transistor and said last-mentioned circuit means being normally operative to establish said quiescent bias for said first transistor.

References Cited by the Examiner

UNITED STATES PATENTS

| | | | |
|---|---|---|---|
| 2,897,353 | 7/1959 | Schweiss. | |
| 2,964,713 | 12/1960 | Shepard | 330—135 |
| 2,971,164 | 2/1961 | Saari | 330—145 |
| 3,023,369 | 2/1962 | Horowitz | 330—145 X |
| 3,223,937 | 12/1965 | McDonald | 330—145 X |

ROY LAKE, *Primary Examiner.*

J. B. MULLINS, *Assistant Examiner.*